United States Patent
Kadowaki (10) Patent No.: US 7,583,394 B2
(45) Date of Patent: Sep. 1, 2009

(54) IMAGE FORMING APPARATUS, CONTROL METHOD, MEMORY MEDIUM, AND PROGRAM

(75) Inventor: Toshihiro Kadowaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 11/474,333

(22) Filed: Jun. 26, 2006

(65) Prior Publication Data
US 2006/0238796 A1 Oct. 26, 2006

Related U.S. Application Data

(62) Division of application No. 10/171,641, filed on Jun. 17, 2002, now Pat. No. 7,113,295.

(30) Foreign Application Priority Data

Jun. 22, 2001 (JP) ............................. 2001/189694
Jun. 4, 2002 (JP) ............................. 2002/162998

(51) Int. Cl.
  G06F 15/00 (2006.01)
  G06F 3/12 (2006.01)
  G06K 1/00 (2006.01)
(52) U.S. Cl. .................................. 358/1.13; 358/1.14
(58) Field of Classification Search .................. 358/1.1, 358/1.13, 1.14, 1.15, 1.7, 1.8, 409, 410, 411, 358/426.02
See application file for complete search history.

(56) References Cited

U.S. PATENT DOCUMENTS

| 5,740,462 A | 4/1998 | Igarashi ...................... 715/542 |
| 5,784,180 A | 7/1998 | Sakai et al. |
| 5,867,720 A | 2/1999 | Hirano |
| 6,038,032 A | 3/2000 | Kokubo ...................... 258/1.12 |
| 6,041,382 A | 3/2000 | Hirano |
| 6,314,267 B1 | 11/2001 | Kida ........................... 399/405 |
| 6,636,338 B1 | 10/2003 | Kida et al. .................. 359/196 |

Primary Examiner—Douglas Q Tran
(74) Attorney, Agent, or Firm—Fitzpatrick, Cella, Harper & Scinto (57) ABSTRACT

An image forming apparatus, a control method, a memory medium, and a program, in which further larger power saving can be accomplished are provided. An N/W interface circuit and a video interface circuit which are constructed so that a communication possible state and a communication impossible state can be independently controlled are provided. Transmission/reception situations of data to/from an external apparatus are monitored and a power supply and a non-power supply of those interfaces are controlled by a control unit, respectively.

18 Claims, 10 Drawing Sheets

IMAGE FORMING APPARATUS, CONTROL METHOD, MEMORY MEDIUM, AND PROGRAM

This application is a divisional application of application Ser. No. 10/171,641, filed Jun. 17, 2002, allowed.

BACKGROUND OF THE INVENTION

1. Field of the Invention

The invention relates to an image forming apparatus for receiving a control code, a character code, or the like inputted from an external apparatus and executing the outputting operation. The invention also relates to a control method for such an apparatus, a memory medium, and a program.

2. Related Background Art

Figure 9:
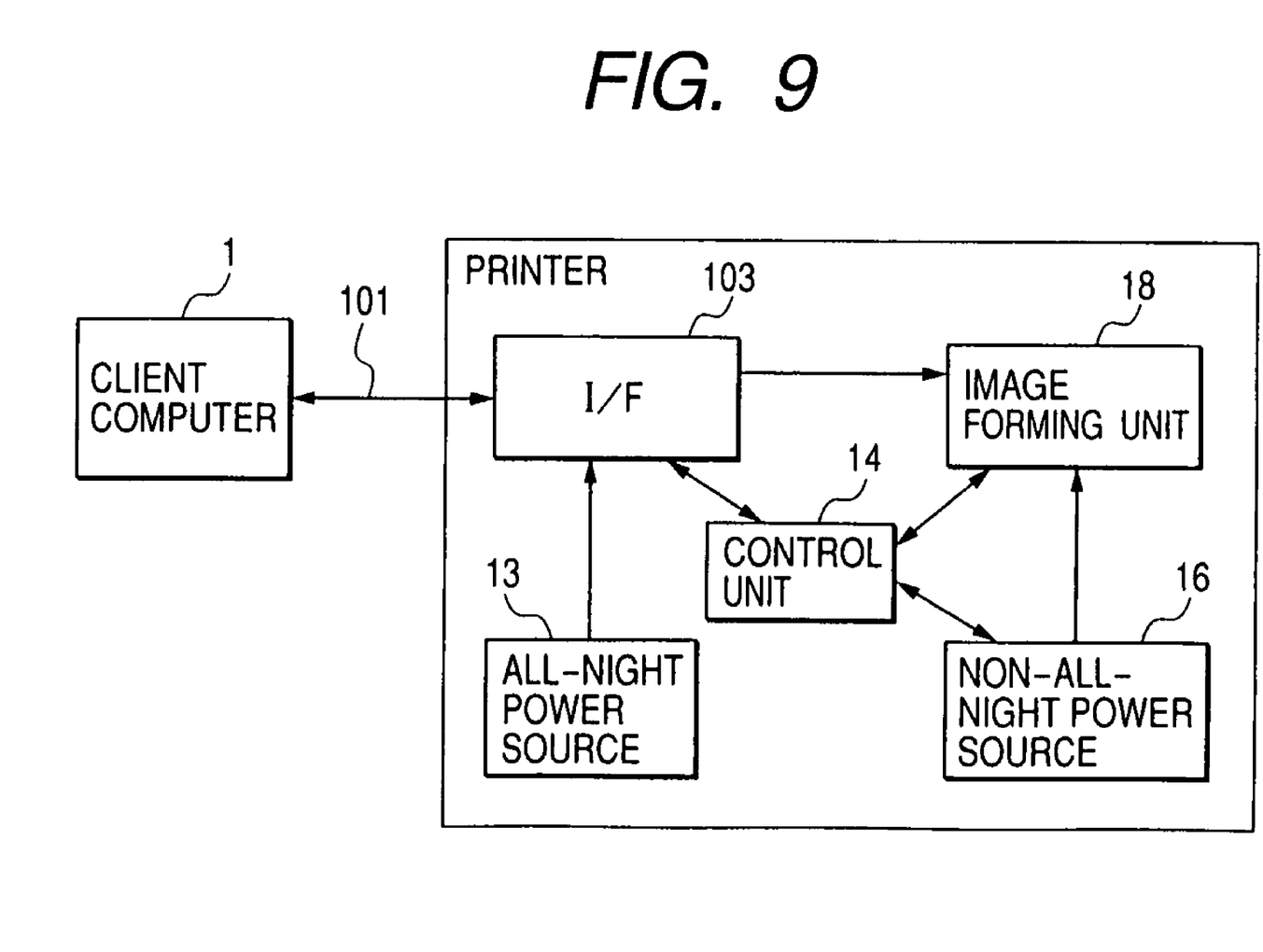
FIG. 9 is a constructional diagram of an image forming system of a conventional example.
Figure 10:
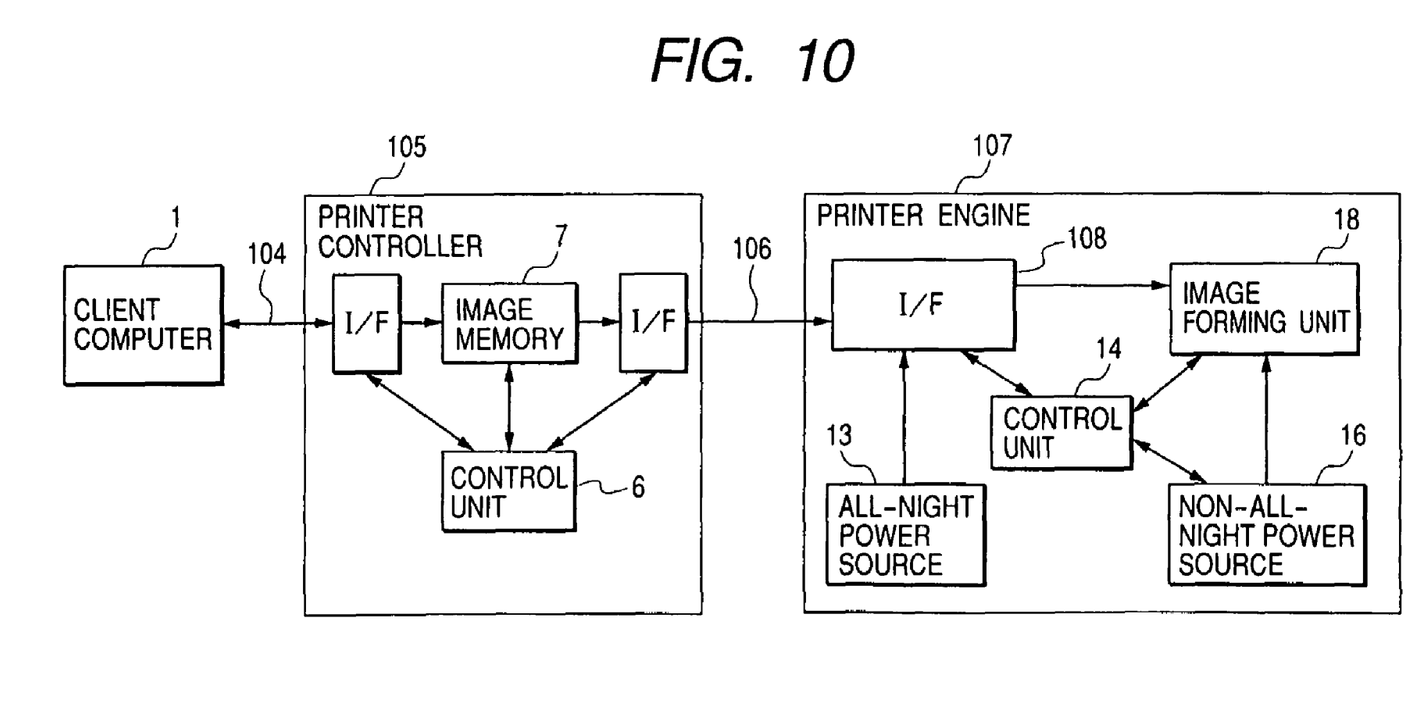
FIG. 10 is a constructional diagram of an image forming system of a conventional example.

Hitherto, a printer interface for allowing an image forming apparatus to form an image on the basis of control information or image information which is sent from an image processing apparatus or an information processing apparatus via the printer interface is constructed as shown in FIG. 9 or 10. FIG. 9 shows a construction such that a print job formed by a client computer 1 serving as an image processing apparatus is sent to a printer 102 serving as an image forming apparatus via a printer interface (I/F) 101 (printer interface cable) and an image is formed by an image forming unit 18. The printer interface 101 is constructed by, for example, a parallel I/F, a network I/F, or the like.

In recent years, in many image forming apparatuses, a mechanism such that if the image forming apparatus has a power saving mode (also referred to as a sleep mode) and is not used for a predetermined period of time, the apparatus enters the power saving mode in which electric power consumption is reduced has been realized.

In the power saving mode, a mechanism such that the electric power consumption is reduced by turning off a part of a non-all-night power source 16 which is supplied to the image forming unit 18 is realized. On the other hand, since an interface circuit 103 needs to receive data from the outside such as a print job which is transmitted from a client computer, a power source is always supplied by an all-night power source 13. A mechanism such that in the power saving mode, when the print job is transmitted from the client computer, the power saving mode is cancelled and the power supply to the image forming unit 18 is restarted, print preparation such that a temperature of a fixing unit is raised to a fixing temperature or the like is made, and after completion of the print preparation, printing is performed is realized.

Subsequently, FIG. 10 shows a construction such that the print job formed by the client computer 1 is sent to a printer controller 105 serving as an image processing apparatus via an interface 104 such as a network (also referred to as "N/W") or the like, raster image data formed from the print job by the printer controller 105 is sent to a printer engine 107 serving as an image forming apparatus via a printer interface 106, and an image is formed by the image forming unit 18. The printer interface 106 is constructed by a video interface, a network, or the like for transmitting the raster image data synchronously with a pixel sync signal. Also in such a construction, in the power saving mode, although the non-all-night power source 16 which is supplied to the image forming unit 18 is partially turned off, since an interface circuit 108 needs to receive a print instruction which is sent from the printer controller 105, a power source is always supplied to the interface circuit 108 by the all-night power source 13.

SUMMARY OF THE INVENTION

However, in the conventional construction shown in FIG. 9 in the embodiment, since the printer interface 101 is constructed by the network I/F or parallel I/F and the print job constructed by the image information and the control information flows by using such an I/F, even in the power saving mode, it is necessary to supply a power source to the interface circuit 103 by the all-night power source 13.

Also in the conventional construction shown in FIG. 10, the printer interface 106 is constructed by the video interface, network I/F, or the like and the print data constructed by the image information and the control information flows by using such an I/F. Therefore, even in the power saving mode, it is necessary to supply a power source to the interface circuit 108 by the all-night power source 13. As mentioned above, there is still room for improvement with respect to a video interface which is used for communication between the printer controller and the printer engine in the image forming apparatus, except for the interface between the host computer and the image forming apparatus.

The invention is made in consideration of the above problems and it is an object of the invention to provide a mechanism such that not only power saving can be executed in case of making data communication with an external client computer but also a printer interface circuit is divided into two systems of a control system and an image system and a power supply to an interface circuit of the image system is suppressed as much as possible, so that even in a video interface for making communication of data between a printer controller and a printer engine, the power saving can be efficiently accomplished, and the power saving exceeding the conventional one is realized.

To accomplish the above object, according to the invention, there is provided an image forming apparatus for forming an image on the basis of image information which is sent to a printer engine from a printer controller having a function for receiving print data which is inputted from a client computer via a predetermined communication line and developing the received print data, comprising: two kinds of interface circuits of a control system interface circuit for receiving control information from the printer controller and an image system interface circuit for receiving the image information from the printer controller; and a mechanism for performing a power control in a manner such that an all-night power source is supplied to the control system interface circuit, a non-all-night power source is supplied to the image system interface circuit, and in a power saving mode, a power supply to the image system interface circuit is not performed.

DETAILED DESCRIPTION OF THE PREFERRED EMBODIMENTS

First Embodiment

Figure 1:
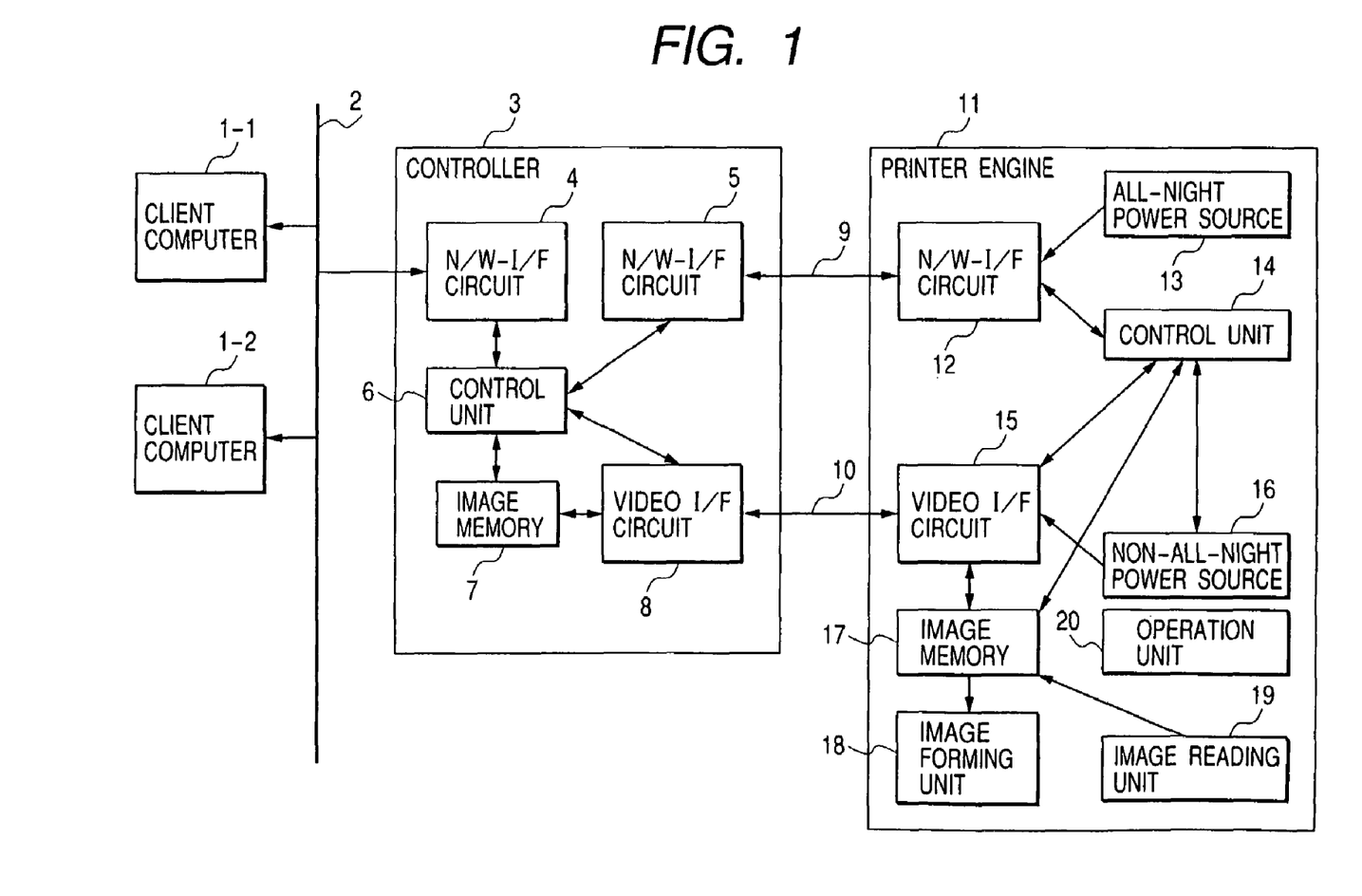
FIG. 1 is a constructional diagram of an image forming system according to the first embodiment.

FIG. 1 is a constructional diagram of an image forming system according to the first embodiment of the invention.

A plurality of client computers (in FIG. 1, client computers 1-1 and 1-2) are connected to a controller 3 (printer) serving as an image processing apparatus by a network 2. The controller 3 and a printer engine 11 are in a state where they can communicate with each other and are constructed in a manner such that communication of print data and various control data can be executed. The embodiment of the invention will be explained with respect to a printer as an example of an image forming apparatus. It is assumed that a desired one of a wireless type and a wired type can be used as a network 2.

For example, if the user wants to allow the printer engine 11 to execute a printing process from the client computer 1-1, a print job formed by the client computer 1 is sent to the controller 3 via the network 2. In case of the embodiment, the print job will be described as an example with respect to PDL data described by a PDL (Page Description Language). However, naturally, it is not limited to the PDL but it is presumed that image data according to a predetermined compression system such as a JPEG or the like or data in various formats such as bit map data and the like is used. Hereinbelow, in the embodiment, data including at least the PDL data, image data, or the like is called image information, and a control command which is used to perform a control such as a print start instruction or the like and does not include print draw command data, image data, and the like is also called control information.

In the controller 3, the PDL data transmitted from the client computer 1-1 is received via a network interface (I/F) circuit 4 (for transmitting and receiving the data of both of the control command and the print data). The received PDL data is developed into raster image data by a control unit 6 and written into an image memory 7.

The network I/F circuit 4 will be described further in detail. In order to communicate with the client computers 1-1 and 1-2, the network I/F circuit 4 has two interface circuits comprising: a control command communicating unit for monitoring a control command such as a print request command or the like which is transmitted from an external apparatus; and a data communicating unit for communicating the print data (page description language or the like). A power supply is controlled so that an all-night power source is supplied to the control command communicating unit. A non-all-night power source is supplied to the data communicating unit.

When no print data is transmitted from the client computer, only the control command communicating unit is activated (power supply) and no power source is supplied to the data communicating unit, thereby setting the data communicating unit to a rest mode. When a control command to start printing which is supplied from the client computer is detected by the control command communicating unit, the data communicating unit is activated (power supply) by a control unit (not shown) so as to receive the print data from the client computer. If it is determined that no print data is transmitted from the client computer, for example, for a predetermined period of time after completion of the communication of the print data, the power supply to the data communicating unit is again stopped by the control unit (not shown). By using only the control command communicating unit, a process for monitoring whether the print data is not transmitted from the client computer or not is executed.

When the print data from the external client computer is monitored, it is presumed that by using a mechanism such that a clock frequency of a CPU for communication is set to a frequency lower than that upon reception of the print data, or the like, the power saving of the network I/F circuit 4 is realized, and in this manner, various power saving methods can be applied to the network I/F circuit 4.

Since the network I/F circuit 4 has the construction as mentioned above, electric power consumption in case of communicating with the external apparatus can be also reduced. It should be noted here that a function of the network I/F circuit 4 and that of a network I/F circuit 5 are different. However, it is assumed that the network I/F circuit 5 will be explained in detail hereinlater.

It is assumed that the control unit 6 has at least a central processing unit (a CPU or an MPU) and non-volatile memory means and various processes are realized by a method whereby the CPU provided in the control unit 6 reads out a predetermined program stored in the non-volatile memory means and executes processes based on the read-out program. The same shall also similarly apply to a control unit 14.

Figure 2:
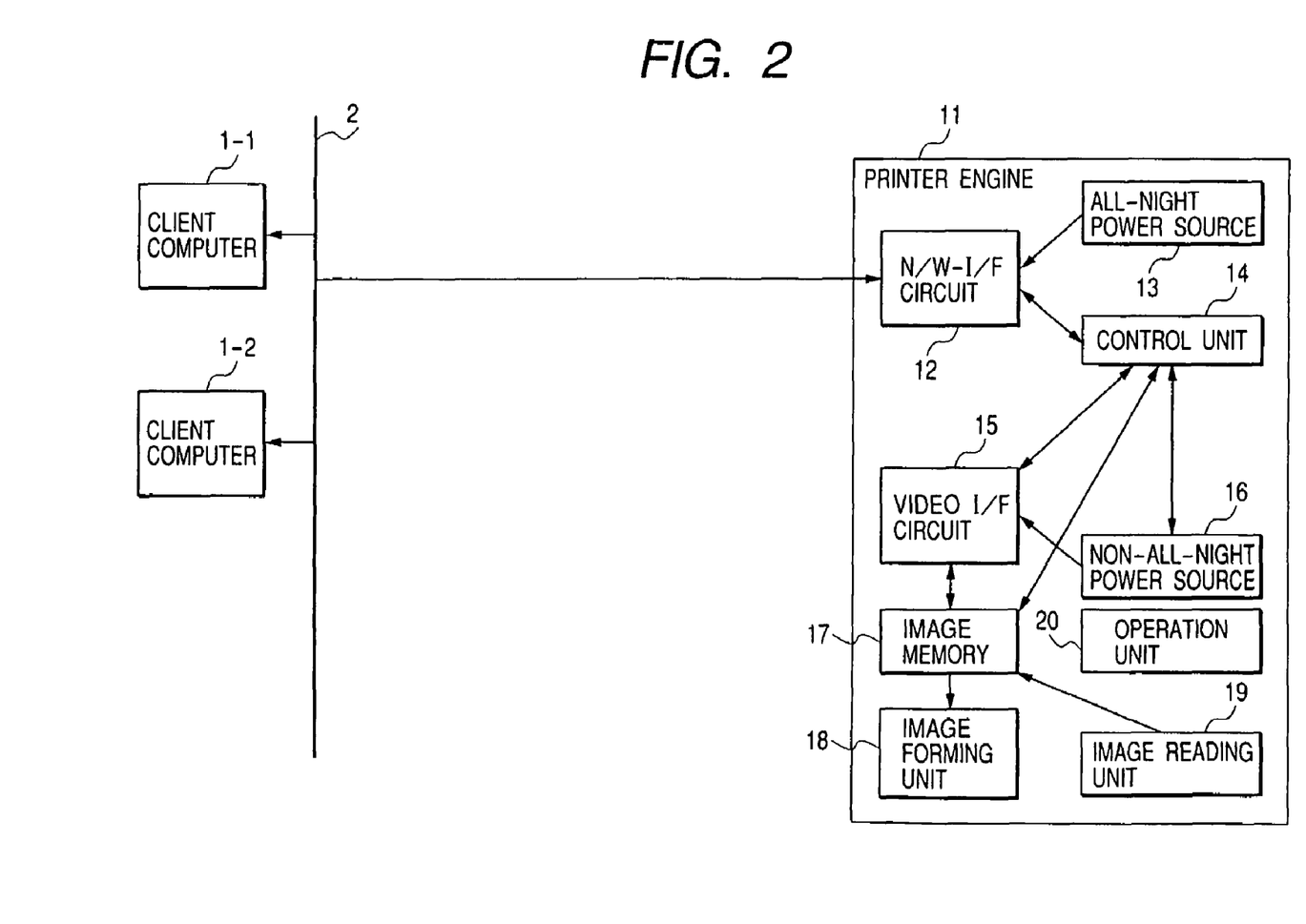
FIG. 2 is another constructional diagram of the image forming system in the first embodiment.

Subsequently, a print command is instructed to the printer engine 11 serving as an image forming apparatus via the network I/F circuit 5 and a network 9 in accordance with development of the PDL data into the raster image, and the printer engine 11 is activated. The network I/F circuit 5 and a network I/F circuit 12 are not limited to the communication of the image data (print data) itself but are mainly used for instructing the activation to the printer engine, designating a paper feed cassette, communicating control command data such as print set information indicative of the number of prints, a print layout, or the like, or obtaining a status or the like of the printer engine. It is assumed that this construction is also similarly applied to a construction as shown in FIG. 2, which will be explained hereinlater.

The image data read out from the image memory 7 is sent to the printer engine 11 via a video I/F circuit 8 and a video I/F 10 and an image is formed.

The printer engine 11 has the network I/F circuit 12 for accepting a print instruction (instruction command information) from the controller 3. Processes based on the received instruction command information are executed by the control unit 14. The printer engine 11 further has a video I/F circuit 15 for receiving the image data which is transmitted from the controller 3. The image data received by the video I/F circuit 15 is written into an image memory 17. After that, a print output is executed by the image forming unit 18 on the basis of the image data written in the image memory 17.

Since the network I/F circuit 12 for receiving the print instruction (instruction command information) from the controller 3 needs to always accept the print instruction (instruction command information) from the controller 3, it is necessary to always supply a power source to the network I/F circuit 12 by the all-night power source 13. Such a power supply is realized by always supplying the power source by a control of the all-night power source 13 and control unit 14.

On the other hand, since the video I/F circuit 15 for receiving the image data which is transmitted from the controller 3 does not need to always receive the image data, a power source is supplied to the video I/F circuit 15 from the non-all-night power source 16 only in a necessary case.

The printer engine 11 in the embodiment is further an MFP (Multi Function Peripheral) having an image reading unit 19 and has a scanning function for transferring the image data read out by the image reading unit 19 to a controller. In this case, the image data read out by the image reading unit 19 is written into the image memory 17 and sent to the controller via the video I/F circuit 15. The video interface 10 is a video I/F for transferring the raster image data synchronously with the image clock. The image data is transmitted by using eight signal lines, so that the data of 8 bits per pixel is sent. The eight signal lines can be bidirectionally used. Upon printing, they are used in the direction from the controller 3 toward the printer engine 11. Upon scanning, they are used in the direction from the printer engine 11 toward the controller 3. An operation unit 20 is used for instructing various operations by the operator and used for setting network addresses or the like which are used in the network I/F circuits 5 and 12.

The all-night power source 13 in the embodiment is a portion for executing a power supplying process such that when a main power source of the image forming apparatus (printer engine 11) is ON, the power source is always set to a power supplying state. The non-all-night power source 16 indicates a portion for executing a process such that under predetermined conditions, for example, in a case where no print data is inputted to the printer for a predetermined period of time, or the like, the power source is turned off or is set to a power saving mode.

The all-night power source 13 and non-all-night power source 16 can be constructed by physically one power source or separate power sources. For example, a construction such that one power source unit has a control function adapted to execute the functions of both of the all-night power source unit and the non-all-night power source unit or a construction such that both of the power source unit and the control unit cooperatively execute a control process is presumed in the invention.

FIG. 2 is another constructional diagram of the image forming system in the first embodiment of the invention. Component elements having similar constructions as those in FIG. 1 are designated by the same reference numerals. FIG. 2 differs from FIG. 1 with respect to a point that the controller 3 does not exist in a form such that it is interposed between the printer engine 11 and the client computer. Since the controller 3 does not exist in this construction, a printing process of the PDL data cannot be executed. However, a printing process of the raster data and a scanning function can be provided.

A construction of the printer engine 11 in FIG. 2 is substantially the same as that in FIG. 1. However, the network I/F circuit 12 is used not for communicating with the controller 3, but used for directly communicating with the client computer 1. Since the video I/F circuit 15 is not used in this construction, the power supply from the non-all-night power source 16 is not performed.

In this construction, in case of executing the printing process of the raster data from the client computer 1, a print job of the raster data is sent from the client computer 1 via the network 2 and network I/F circuit 12, written into the image memory 17 under a control of the control unit 14, and printed by the image forming unit 18. On the other hand, in case of performing the scanning process, the image data read out by the image reading unit 19 is written into the image memory 17 and sent to the client computer 1 via the network I/F circuit 12 and network 2 under the control of the control unit 14.

By constructing the interface between the controller 3 and printer engine 11 by the network as mentioned above, two kinds of constructions of the first construction (FIG. 1) in which the controller 3 exists and the second construction (FIG. 2) in which the controller 3 does not exist can be taken, and it is sufficient that the construction of the printer engine 11 in FIG. 1 and that in FIG. 2 are the same.

Figure 3:
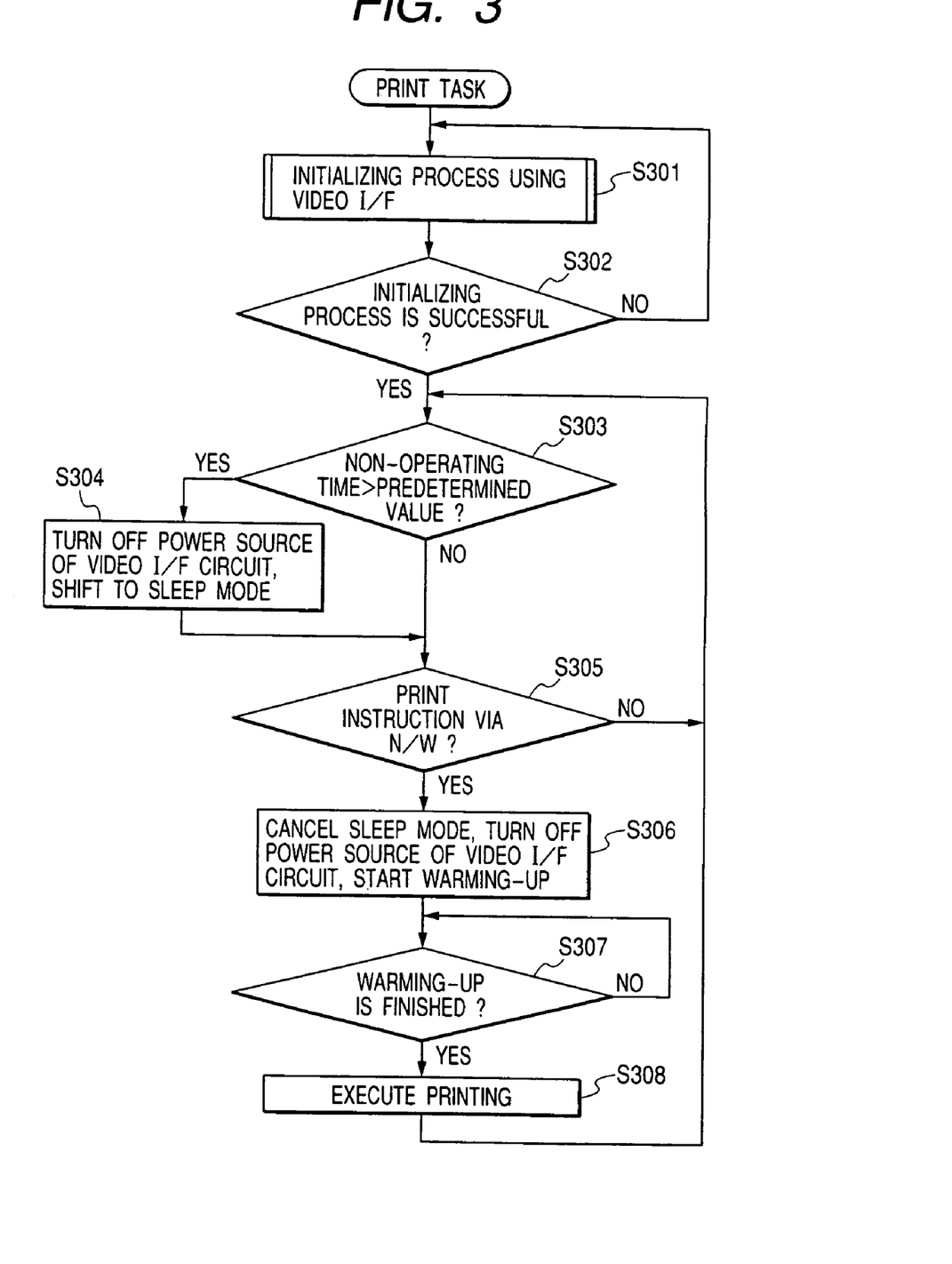
FIG. 3 is a flowchart for a print task of an image forming apparatus in the first embodiment.

FIG. 3 is a control flowchart for a print task in the printer engine 11 in the first embodiment. Each processing step in the flowchart of FIG. 3 is executed by the printer engine 11 and it is assumed that those processes are realized by a method whereby the CPU provided in the printer engine 11 reads out a predetermined program stored in the non-volatile memory means and executes the processes on the basis of the read-out program.

First, in step S301, an initializing process is executed by using the video I/F and this process will be explained in detail hereinlater with reference to FIG. 4.

Subsequently, whether the initializing process has successfully been executed or not is discriminated in S302. If it fails, the processing routine is returned to the process in S301 and the initializing process is executed again. If it is decided that the initializing process was successful, whether a non-operating time exceeds a predetermined value or not is discriminated in S303. The term "non-operating time" denotes a time during which, for example, a print outputting process based on the PDL is not executed.

If it is determined in S303 that the non-operating time exceeds the predetermined value, that is, if a command to instruct the activation of the print output is not recognized for a predetermined period of time, the power supply to the video I/F circuit 15 is stopped (this means that the power source which is supplied is set to zero or suppressed to a value near zero) and the power supply to the image forming unit 18 is also partially stopped in S304. Thus, the whole printer engine 11 is shifted to the power saving mode called a sleep mode. That is, if the printing operation is not executed for the predetermined period of time, the printer engine 11 is automatically shifted to the power saving mode in order to save the electric power consumption. Also in the power saving mode, a power source is supplied to the network interface (N/W I/F) circuit 12. The turn-off of the power supply to the video I/F circuit in the invention denotes that since no power source is supplied to the I/F circuit, transmission and reception of the signal are not executed. That is, it means that the interface is set to an inactive (inoperative) mode and communication is disabled (non-communication).

Subsequently, whether a print instruction has been transmitted from the controller 3 via the network I/F circuit 12 or not is discriminated in S305. If it is determined that the print instruction command is not transmitted, the processing routine is returned to S303. The print instruction command here denotes a process which is executed by the controller 3 in response to the entering of the print job from the client computer to the controller 3 and in accordance with the development of the PDL data into the raster mage. Thus, the printer engine can be efficiently activated from the sleep mode in accordance with the entering of the job to the controller 3 which plays a role of communication with the client computer.

If it is determined that the print instruction has been transmitted, the sleep mode is cancelled in S306 and, at the same time, the power supply to the video I/F circuit 15 is started, so that use of the video I/F circuit 15 is enabled. By cancelling the sleep mode, the power supply to the image forming unit 18 is also started again, so that a warming-up process such as heating or the like of the fixing unit is started.

Subsequently, whether the warming-up process has been finished or not is discriminated in S307. If it is determined that the warming-up process has been finished because a temperature of the fixing unit reached a temperature at which the fixing can be performed, or the like, the printing operation is executed in order to form the image data received from the video I/F 10 onto a recording medium such as paper or the like in S308.

As mentioned above, in the first embodiment, since the power supply to the video I/F circuit 15 is stopped in the sleep mode, the electric power consumption is reduced as compared with the conventional one. In other words, since the conventional video I/F circuit for performing the transmission and reception of the data between the printer controller and the printer engine is used in common for both of the control system data communication and the image system data communication, a large electric power is wasted also in case of making communication of the control system data. However, according to the embodiment, since the network I/F circuits 5 and 12 and the video I/F circuits 8 and 15 are independently provided, respectively, if there is no need to use the video I/F circuits, the power supply to the video interface can be stopped and the power source is supplied only to the network interface of a small electric power consumption. Thus, the electric power can be remarkably saved.

Figure 4:
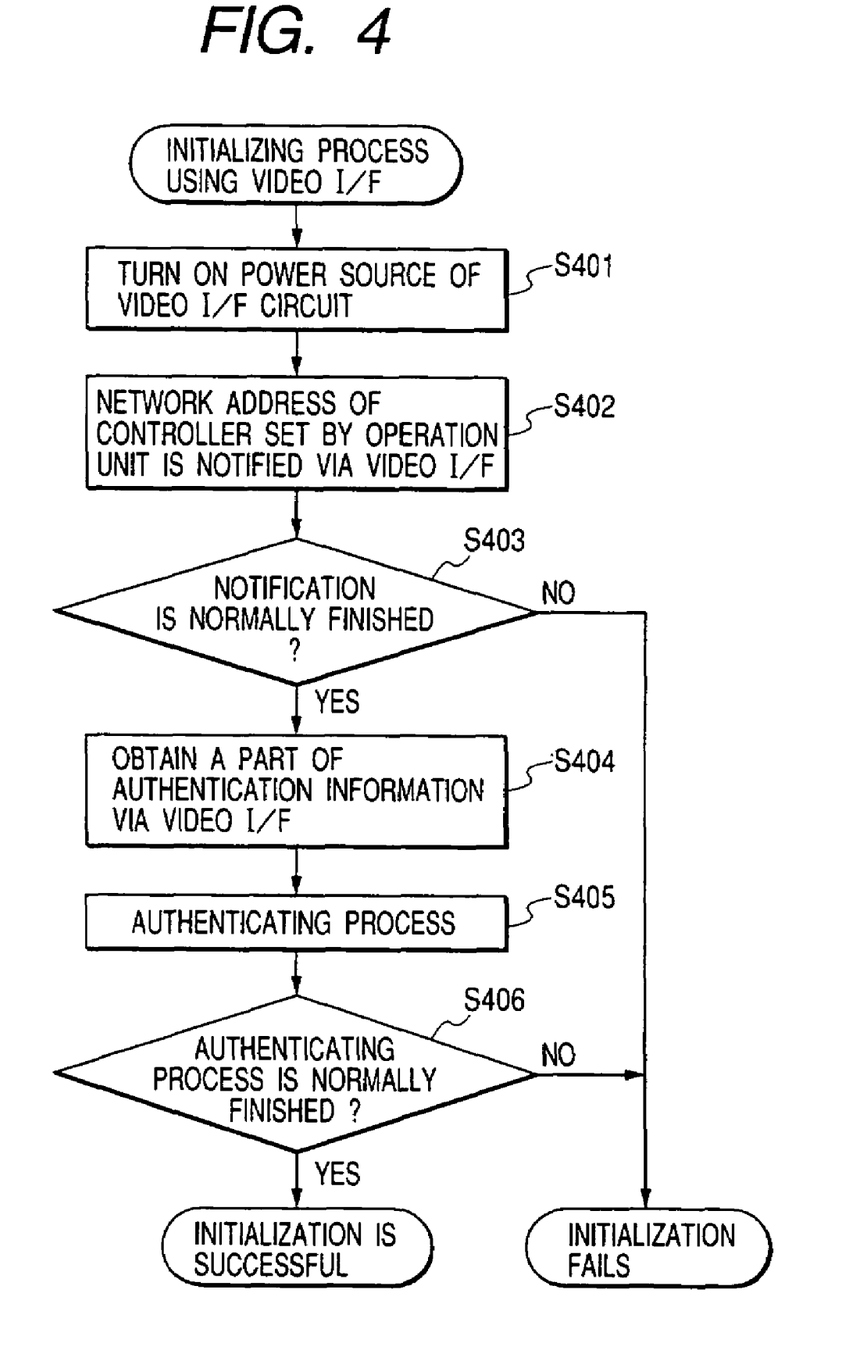
FIG. 4 is a flowchart for an initializing process of the print task of the image forming apparatus in the first embodiment.

FIG. 4 is a flowchart for explaining the initializing process using the video I/F and shows detailed contents of the process in S301 in FIG. 3.

First, in S401, the power supply to the video I/F circuit is turned on, thereby enabling the video I/F circuit 15 to be used.

Subsequently, in S402, the controller 3 is notified of the network address for the controller 3 which has been set by the operation unit 20 via the video I/F 10. The operation unit 20 has a function for inputting predetermined data, has a liquid crystal touch panel, various operation buttons, and the like, and also has a function in which predetermined information, the print instruction, or the like can be inputted. In the embodiment, the control information between the controller 3 and printer engine 11 is transmitted and received by using TCP/IP communication on the N/W-I/F.

To make the TCP/IP communication on the N/W-I/F, since the communication cannot be made unless the network address of an apparatus on the partner side is recognized, in the embodiment, before the communication is made by the N/W-I/F, the network address is notified via the video I/F.

Subsequently, in S403, whether the network address has successfully been notified or not is discriminated. If it is determined that the notification is not successful, the processing routine is finished as a failure in the initialization. In this case, since it is decided in S302 in FIG. 3 that the initialization is not successful, the initializing process is executed again in S301.

In S404, a part of authentication information which is used in an authenticating process is obtained from the controller 3 via the video I/F. In S405, the authenticating process is executed. The authenticating process is a process for discriminating whether the connected controller 3 is a legal controller or not, that is, whether it is a product designed so as to properly control the printer engine 11 or not. If a controller other than the legal controller 3 is connected to the printer engine 11, it is not guaranteed that restriction items to be kept in case of using the printer engine 11, such as a maximum toner use amount (toner coverage restriction) which is permitted to be adhered per pixel, and the like are assured. There is, consequently, a possibility that it becomes a factor of reduction of a service life of the printer engine 11 or a dangerous factor of an increase in failure ratio is included. Therefore, the printer engine 11 of the embodiment obtains the authentication information from the controller 3 and collates it with internal data in the printer engine 11, thereby discriminating whether the connection partner is a legal controller or not. If the authentication information is transmitted and received by the N/W-I/F as a general I/F, a danger that it is analyzed by using a commercially available tool such as a protocol analyzer or the like on the N/W is high. To avoid it, according to the print system of the embodiment, secrecy is raised by transmitting and receiving a part of the authentication information via the video I/F as a unique I/F. In S406, whether the authenticating process has successfully been executed or not is discriminated. If it is successful, the processing routine is finished as a successful initialization. If the authentication information cannot be obtained or the obtained authentication information is incorrect, the authenticating process fails and the processing routine is finished as an initialization failure. If the initialization fails, it is determined in S302 in FIG. 3 that the initialization is unsuccessful. Therefore, the initializing process is executed again in S301.

In the embodiment, the network address of the controller 3 is sent from the printer engine 11 to the controller 3. However, it is also presumed that the network address of the printer engine 11 is sent from the printer engine 11 to the controller 3. On the contrary, a form such that the network address of the controller 3 or printer engine 11 is sent from the controller 3 to the printer engine 11 is also presumed as another embodiment. A form such that a selection number indicating which one of a predetermined plurality of network addresses is used is notified in place of the network address is also presumed as another embodiment.

Second Embodiment

The second embodiment of the invention differs from the first embodiment with respect to only the initializing process and a point that the construction of the video I/F is variable. Therefore, only different portions will be explained hereinbelow.

Figure 5:
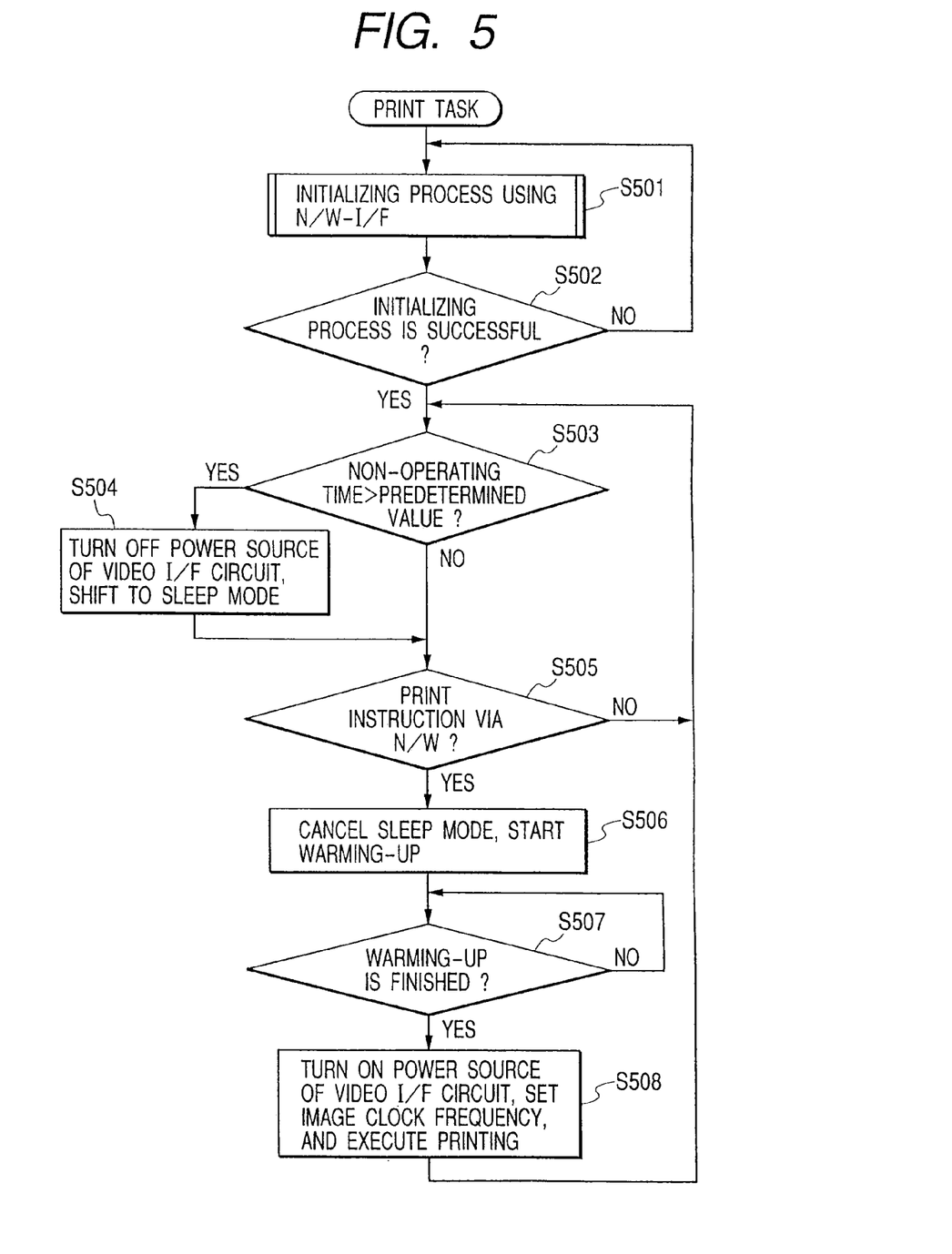
FIG. 5 is a flowchart for a print task of an image forming apparatus in the second embodiment.

FIG. 5 is a control flowchart for a print task in the second embodiment. Each processing step in the flowchart of FIG. 5 is executed by the printer engine 11 and it is assumed that those processes are realized by a method whereby the CPU provided in the printer engine 11 reads out a predetermined program stored in the non-volatile memory means and executes the processes on the basis of the read-out program.

FIG. 5 corresponds to FIG. 3 in the first embodiment. First, the second embodiment differs from the first embodiment with respect to the following first point. That is, the initializing process is executed by using the video I/F in step S301 in FIG. 3 in the first embodiment. However, in step S501 in FIG. 5 in the second embodiment, the initializing process is executed by using the N/W-I/F and this process will be explained hereinlater with reference to FIG. 6.

Subsequently, the second embodiment differs from the first embodiment with respect to the following second point. That is, the power supply to the video I/F circuit is started simultaneously with the cancellation of the sleep mode in step S306 in FIG. 3 in the first embodiment. However, in step S508 in FIG. 5 in the second embodiment, the power supply to the video I/F circuit is started after completion of the warming-up of the printer main body. According to the system of the first embodiment, since the control of the power supply to the fixing unit or the like and the control of the power supply to the video I/F circuit can be simultaneously executed, there are advantages such that the circuit construction is simplified and the control is also simple. On the other hand, according to the system of the second embodiment, the power supply to the video I/F circuit can be delayed, that is, timing when the video I/F circuit can be used can be delayed after the cancellation of the sleep mode until the end of the warming-up. There is, consequently, a special effect such that a power saving effect larger than that of the system of the first embodiment is obtained. Since the power supply to the video I/F circuit is not performed during the warming-up in which the electric power consumption is large because the fixing unit is heated, there is also an advantage such that the peak electric power consumption of the printer engine 11 can be also reduced. The mechanism such that the power source is supplied to the video I/F circuit (the video I/F circuit can be used) after completion of the warming-up process of the printer main body, particularly, the engine unit has been described above. However, a form such that the power source is supplied to the video I/F circuit a predetermined time before the timing of completion of the warming-up in consideration of a time which is necessary for a process to transmit image development data from the controller 3 to the printer engine 11 is also presumed in the second embodiment. By this construction, a mechanism such that the wasteful electric power consumption is prevented and the printing process can be more efficiently executed can be provided.

Subsequently, the second embodiment differs from the first embodiment with respect to the following third point. That is, in S508 in FIG. 5, after the power source of the video I/F circuit was turned on, a clock frequency of the image clock for synchronizing the image data with the video I/F circuit is set. The video I/F circuit 15 in the embodiment has a plurality of clock oscillators and by selecting a proper one of the clock oscillators by a selector (not shown), one of a plurality of image clock frequencies can be used. The image clock frequency which is selected here is determined in a processing routine of FIG. 6, which will be explained hereinlater.

Figure 6:
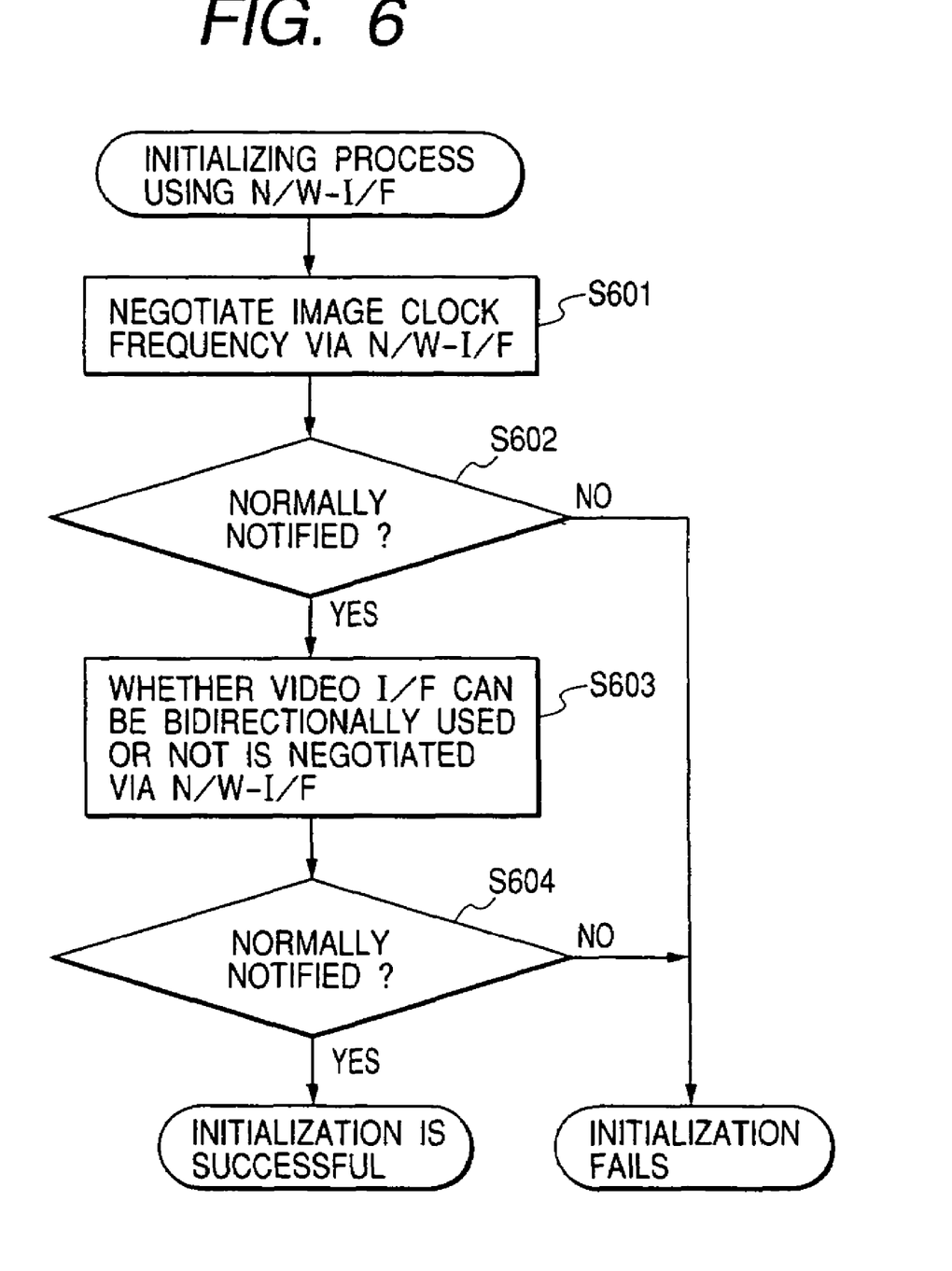
FIG. 6 is a flowchart for an initializing process of the print task of the image forming apparatus in the second embodiment.

FIG. 6 is a flowchart for explaining an initializing process of the video I/F using the N/W-I/F in the second embodiment and corresponds to detailed contents of the process in S501 in FIG. 5. Each processing step in the flowchart of FIG. 6 is executed by the printer engine 11 and it is assumed that those processes are realized by a method whereby the CPU provided in the printer engine 11 reads out a predetermined program stored in the non-volatile memory means and executes the processes on the basis of the read-out program.

First, in S601, the clock frequency which is used for the video I/F is negotiated with the controller 3 via the N/W-I/F. As mentioned above, in the video I/F circuit 15 of the printer engine 11, one of the plurality of clock frequencies can be selected, and which one is used is determined by communicating with the controller 3. In the embodiment, the highest clock frequency which can be used in the video I/F circuit 8 on the controller 3 side is sent to the printer engine 11 side. On the printer engine 11 side, it is compared with the highest clock frequency which can be used in the video I/F circuit 15 on the printer engine 11 side, the lower one of the clock frequencies is selected, and the controller 3 side is notified of it. A case where the selected clock frequency is merely notified from the printer engine 11, a case where it is merely notified from the controller 3, or a case where a number value of a predetermined clock frequency is sent in place of a numerical value of the clock frequency is also incorporated as another embodiment.

Subsequently, in S602, whether the negotiation has successfully been performed or not is discriminated, if it does not succeed, the processing routine is finished as initialization failure. In this case, since it is determined in S502 in FIG. 5 that the initialization is unsuccessful, the initializing process is executed again in S501.

In S603, whether the signal line for the image data which is used by the video I/F 10 can be bidirectionally used or not is negotiated with the controller 3 via the N/W-I/F. In the general printer, the signal line for the image data can be used only in one direction from the controller to the printer. However, in an MFP or the like having the scanner function, there is a peripheral device which has a circuit construction that can bidirectionally use the signal line for the image data and which is used for sending scan image data from the MFP side to the controller when the scanner function is executed. In S603, whether the video I/F circuit 15 on the printer engine 11 side and the video I/F circuit 8 on the controller 3 side have the circuit construction in which the signal line for the image data can be bidirectionally used or not is confirmed by communicating via the N/W-I/F.

Subsequently, in S604, whether this negotiation has successfully been performed or not is discriminated, if it does not succeed, the processing routine is finished as initialization failure. In this case, since it is determined in S502 in FIG. 5 that the initialization is unsuccessful, the initializing process is executed again in S501.

In the embodiment, the clock frequency and the bidirectional transmission of the video signal have been determined by the negotiation between the printer engine 11 and controller 3. However, a form in which they are decided on the printer engine 11 side and the controller 3 side is notified of it is also presumed as another embodiment. A form in which they are decided on the controller 3 side and the printer engine 11 side is notified of it is also presumed as another embodiment.

Figure 7:
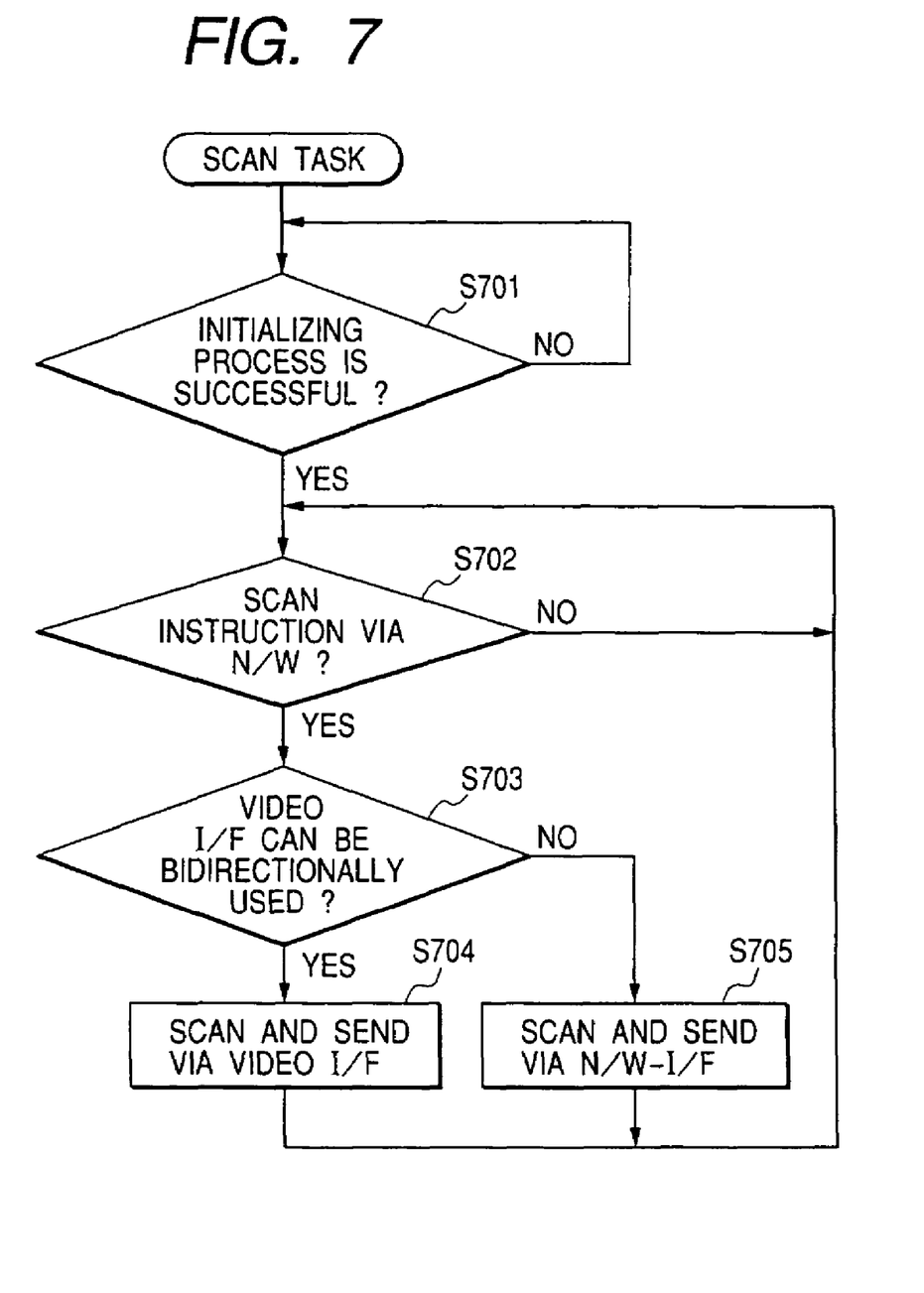
FIG. 7 is a flowchart for a scan task of the image forming apparatus in the second embodiment.

FIG. 7 is a control flowchart for a scan task in the second embodiment. Each processing step in the flowchart of FIG. 7 is executed by the printer engine 11 and it is assumed that those processes are realized by a method whereby the CPU provided in the printer engine 11 reads out a predetermined program stored in the non-volatile memory means and executes the processes on the basis of the read-out program.

First, in S701, whether the initializing process in the print task in FIG. 6 has successfully been executed or not is confirmed, and the apparatus is in a standby mode until it succeeds. If the initialization is successful, the apparatus waits until the scan instruction is sent via the N/W-I/F in S702. When the scan instruction is received, whether the video I/F can be bidirectionally used or not is discriminated in S703. This discrimination is made by using a result of the negotiation with the controller 3 side in S603 of the initializing process in FIG. 6. If the video I/F can be bidirectionally used, in S704 the scanning operation is executed and the read-out scan image data is transferred to the controller synchronously with the image clock by using the signal line for the image data on the video I/F.

If the discrimination result in S703 indicates that the video I/F cannot be bidirectionally used, in S705 the scanning operation is executed and the read-out scan image data is once stored into an image memory and sent to the controller by using the N/W-I/F.

In case of sending the scan image data by the video I/F, since it is transmitted without passing through the memory and can be sent synchronously with the image clock, there is an advantage such that it can be transmitted at a high speed.

On the other hand, in case of sending the scan image data by the N/W-I/F, there are advantages such that even if the video I/F cannot be bidirectionally used, the scan image data can be sent and, also in a case where a receiving speed of the partner side apparatus is slow, the scan image data can be sent in accordance with the receiving speed of the partner side apparatus.

It is also presumed a case where the power supply to the image system interface is performed in a first mode (in the case where the video I/F can be used) in which the control information and the image information are received via the different interface circuits in the communication between the printer controller 3 and printer engine 11 which received the print data from the client computer and the power supply to the image system interface is not performed in a second mode (in the case where the video I/F is not used) in which the control information and the image information are received only via the control system interface circuit. Thus, the larger power saving can be realized for not only the scan instruction but also the print job from the client computer.

Third Embodiment

Since the third embodiment of the invention differs from the second embodiment with respect to only a control method of the power source of the video I/F circuit 15, only a different portion will be explained.

Figure 8:
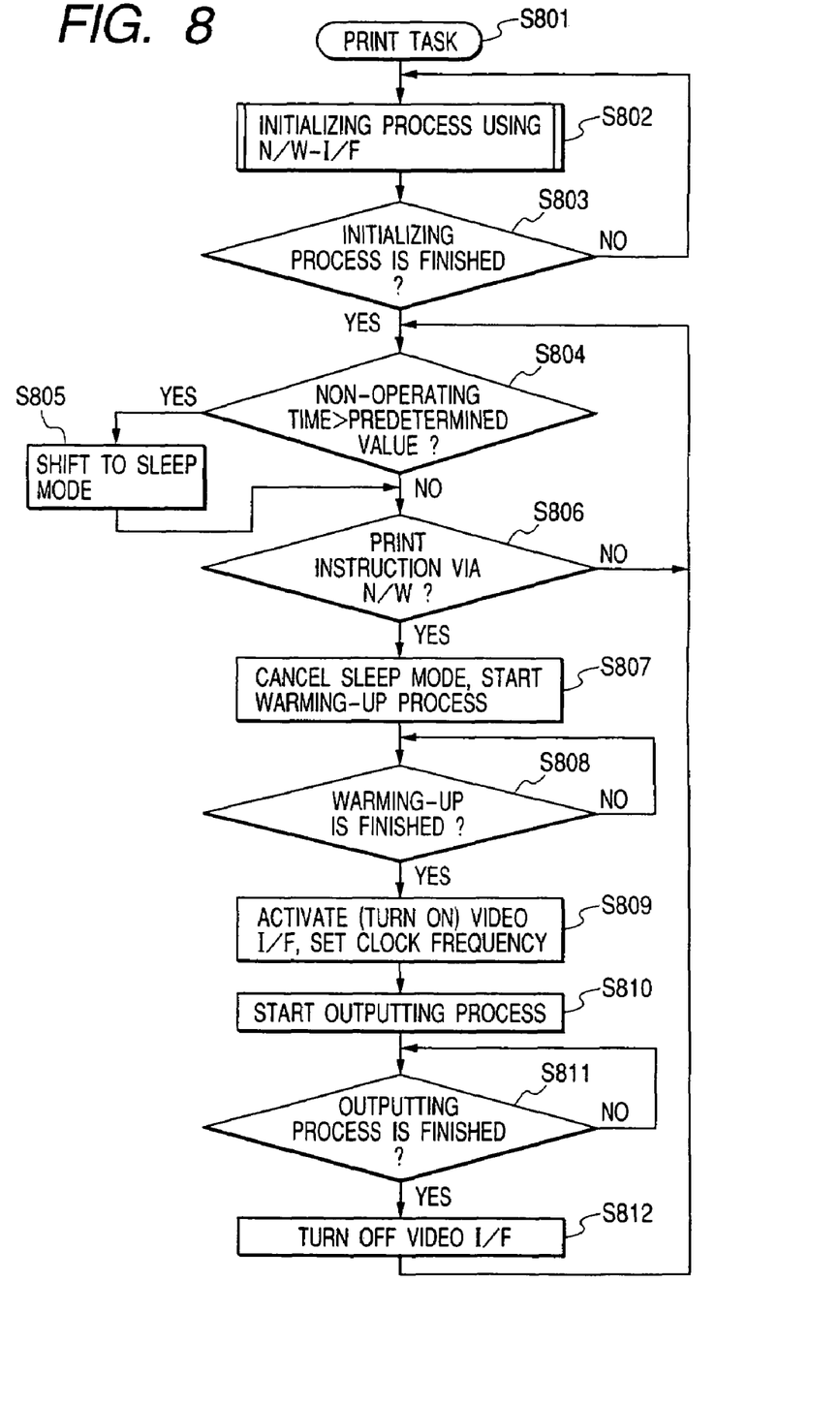
FIG. 8 is a flowchart for a print task of an image forming apparatus in the third embodiment.

FIG. 8 is a control flowchart for a print task in the third embodiment and corresponds to FIG. 5 in the second embodiment. In the second embodiment, the apparatus is controlled so as to turn on the power source of the video I/F circuit upon execution of the printing operation in S508 in FIG. 5 and to turn off the power source of the video I/F circuit upon shifting to the sleep mode in S504 in FIG. 5.

On the other hand, in the third embodiment, the control of the power source of the video I/F circuit 15 is not performed upon shifting to the sleep mode in S805, but the power source of the video I/F circuit is turned on upon execution of the printing operation in S812, and immediately after completion of the printing operation, the power source of the video I/F circuit is turned off.

The operation of the printer engine 11 in the third embodiment will now be described with reference to FIG. 8. Each processing step in the flowchart of FIG. 8 is executed by the printer engine 11 and it is assumed that those processes are realized by a method whereby the CPU provided in the printer engine 11 reads out a predetermined program stored in the non-volatile memory means and executes the processes on the basis of the read-out program.

First, since processes in steps S801 to S803 are similar to the processes described above, their overlapped explanation is omitted here.

Subsequently, in S804, when the non-operating time of the printer exceeds the predetermined value in S804, that is, if the print instruction is not generated from the controller for a predetermined period of time, a process to shift the operating mode to the sleep mode is executed in S805. As will be explained hereinlater, it is now assumed that the video I/F circuit has already been turned off and other portions of the printer, for example, the engine unit and the like are shifted to the sleep mode.

If it is determined in S804 that the non-operating time does not exceed the predetermined value, whether the print instruction has been sent via the N/W or not is further discriminated in S806. If NO, the processes from S804 are repeated. If it is decided that the print instruction has been sent, the sleep mode of each portion of the printer which has been shifted to the sleep mode in S805 is cancelled and the warming-up process is started in S807.

If it is determined in S808 that the warming-up process has been finished, the power source of the video I/F circuit is turned on in S809. Further, a process for recording an image onto a paper medium is started (outputting process is started) in S810. If it is decided in S811 that the outputting process has been finished, a process to turn off the power source of the video I/F again is executed.

A form such that if NO in the discriminating process in S806 and the process in S804 is repeated, in the case where the printer has already been in the sleep mode, the process is executed so that the discrimination result in S804 is NO is also presumed in FIG. 8.

According to the system of the second embodiment, there is an advantage such that since the power supplying mode is held before the operating mode is shifted to the sleep mode, if the next print job is received for such a period of time, the process to turn on the power source is unnecessary. According to the system of the third embodiment, since the power source of the video I/F circuit is turned on only for a period of time when the printing (outputting process) is being executed, a special effect such that the electric power consumption upon non-printing can be further reduced as compared with that in the second embodiment can be obtained.

According to the first to third embodiments as mentioned above, not only the power saving can be accomplished in case of communicating data with the external client computer but also the printer interface is divided into two systems of the control system and the image system and they are independently controlled, respectively, so that, for example, by suppressing the power supply to the interface circuit of the image system as much as possible, the power saving can be efficiently performed also in the video interface for communicating data between the printer controller and the printer engine, and the image forming system (mechanism) in which the power saving more than the conventional one is realized can be provided.

Other Embodiments

The invention can be applied to a system comprising a plurality of apparatuses (for example, a host computer, an interface device, a reader, a printer, and the like) or can be also applied to an apparatus comprising one equipment (for example, a copying apparatus, a facsimile apparatus, a hybrid apparatus having a copying function, a facsimile function, and the like, etc.).

Naturally, the object of the invention is accomplished by a method whereby a memory medium (or a recording medium) in which program codes of software for realizing the functions of the embodiments mentioned above have been recorded is supplied to a system or an apparatus, a computer (or a CPU or an MPU) of the system or apparatus reads out the program codes stored in the memory medium and executes them. In this case, the program codes themselves read out from the memory medium realize the functions of the embodiments mentioned above, and the memory medium in which the program codes have been stored constructs the invention.

Naturally, the invention incorporates not only a case where the computer executes the read-out program codes, so that the functions of the embodiments mentioned above are realized, but also a case where an operating system (OS) or the like which is operating on the computer executes a part or all of actual processes on the basis of instructions of the program codes, and the functions of the embodiments mentioned above are realized by those processes.

Further, the invention also incorporates a case where the program codes read out from the memory medium are written into a memory equipped in a function expanding card inserted into a computer or a function expanding unit connected to a computer and, thereafter, a CPU or the like provided for the function expanding card or function expanding unit executes a part or all of actual processes on the basis of instructions of the program codes, and the functions of the embodiments mentioned above are realized by those processes.

In case of applying the invention to the foregoing memory medium, program codes corresponding to sequence diagrams and flowcharts which have been described above are stored into the memory medium.

What is claimed is:

1. An image processing apparatus for connection to a printing apparatus having a first interface unit and a second interface unit and for receiving print data from a client computer via a network, said image processing apparatus comprising:
   a conversion unit adapted to convert the received print data into image data;
   a print instruction unit adapted to providing a print instruction to the second interface unit of the printing apparatus; and
   an output unit adapted to output the image data convened by said conversion unit to the first interface unit of the printing apparatus in accordance with supplying of power to the first interface unit which has been in a power-reduced status in response to the print instruction provided by said print instruction unit.

2. An image processing apparatus according to claim 1, further comprising an obtaining unit adapted to obtain a status of the printing apparatus via the second interface unit irrespectively of a status of power supply to the first interface unit.

3. An image processing apparatus according to claim 1, wherein the first interface unit comprises a video interface unit and the second interface unit comprises a network interface unit.

4. An image processing apparatus according to claim 1, wherein power is not supplied to the first interface unit in the power-reduced status.

5. A printing apparatus for connection to an image processing apparatus which receives print data from a client computer via a network and converts the received print data into image data, said printing apparatus comprising:
   a first interface unit which is capable of receiving the image data convened by the image processing apparatus when the first interface unit is not in a power-reduced status;
   a power control unit adapted to place said first interface unit in the power-reduced status; and
   a second interface unit adapted to receive a print instruction from the image processing apparatus irrespectively of a status of power supply to said first interface unit,
   wherein said power control unit resumes supplying of power to said first interface unit which has been in the power-reduced status in response to reception of the print instruction by said second interface unit, so as to enable said first interface unit to receive the converted image data.

6. A printing apparatus according to claim 5, wherein said second interface unit further receives print setting information from the image processing apparatus.

7. A printing apparatus according to claim 5, further comprising a reading unit, adapted to read image data in response to reception of a scan instruction by said second interface unit.

8. A printing apparatus according to claim 5, wherein power is not supplied to said first interface unit in the power-reduced status.

9. An image processing method for an image processing apparatus for connecting to a printing apparatus having a first interface unit and a second interface unit and for receiving print data from a client computer via a network, said image processing method comprising the steps of:
   convening the received print data into image data;
   providing a print instruction to the second interface unit of the printing apparatus; and
   outputting the image data convened in said converting step to the first interface unit of the printing apparatus in accordance with supplying of power to the first interface unit which has been in a power-reduced status in response to the print instruction provided in said print instruction providing step.

10. An image processing method according to claim 9, further comprising a step of obtaining a status of the printing apparatus via the second interface unit irrespectively of a status of power supply to the first interface unit.

11. An image processing method according to claim 9, wherein the first interface unit comprises a video interface unit and the second interface unit comprises a network interface unit.

12. An image processing method according to claim 9, wherein power is not supplied to the first interface unit in the power-reduced status.

13. A printing method for a printing apparatus for connection to an image processing apparatus which receives print data from a client computer via a network and converts the received print data into image data, said printing method comprising the steps of:
   receiving the image data converted by the image processing apparatus when the first interface unit is not in a power-reduced status;
   placing the first interface unit in the power-reduced status; and
   receiving a print instruction from the image processing apparatus irrespectively of a status of power supply to the first interface unit,
   wherein supply of power to the first interface unit which has been in the power-reduced status is resumed in response to reception of the print instruction by the second interface unit, so as to enable the first interface unit to receive the convened image data.

14. A printing method to claim 13, wherein the second interface unit further receives print setting information from the image processing apparatus.

15. A printing method according to claim 13, further comprising a reading step of reading image data in response to reception of a scan instruction by the second interface unit.

16. A printing method according to claim 13, wherein power is not supplied to the first interface unit in the power-reduced status.

17. A computer-readable medium storing a program of an image processing method for an image processing apparatus for connecting to a printing apparatus having a first interface unit and a second interface unit and for receiving print data from a client computer via a network, said image processing method comprising the steps of:
   convening the received print data into image data;
   providing a print instruction to the second interface unit of the printing apparatus; and
   outputting the image data convened in said converting step to the first interface unit of the printing apparatus in accordance with supplying of power to the first interface unit which has been in a power-reduced status in response to the print instruction provided in said print instruction providing step.

18. A computer-readable medium storing a program of a printing method for a printing apparatus for connection to an image processing apparatus which receives print data from a client computer via a network and converts the received print data into image data, said printing method comprising the steps of:

receiving the image data converted by the image processing apparatus when the first interface unit is not in a power-reduced status;

placing the first interface unit in the power-reduced status; and receiving a print instruction from the image processing apparatus irrespectively of a status of power supply to the first interface unit, wherein supply of power to the first interface unit which has been in the power-reduced status is resumed in response to reception of the print instruction by the second interface unit, so as to enable the first interface unit to receive the converted image data.

* * * * *